United States Patent
Ogawa et al.

(10) Patent No.: US 9,234,072 B2
(45) Date of Patent: Jan. 12, 2016

(54) NON-CRYSTALLINE POLYESTER RESIN, AND BINDER RESIN AND BINDER RESIN DISPERSION FOR TONER

(71) Applicants: Koji Ogawa, Fukui (JP); Masaaki Hosoda, Fukui (JP); Yasumichi Moriyama, Fukui (JP); Masakazu Nishino, Fukui (JP)

(72) Inventors: Koji Ogawa, Fukui (JP); Masaaki Hosoda, Fukui (JP); Yasumichi Moriyama, Fukui (JP); Masakazu Nishino, Fukui (JP)

(73) Assignee: Nicca Chemical Co., Ltd. (JP)

( * ) Notice: Subject to any disclaimer, the term of this patent is extended or adjusted under 35 U.S.C. 154(b) by 0 days.

(21) Appl. No.: 14/353,071

(22) PCT Filed: Oct. 17, 2012

(86) PCT No.: PCT/JP2012/076837
§ 371 (c)(1),
(2) Date: Apr. 21, 2014

(87) PCT Pub. No.: WO2013/058279
PCT Pub. Date: Apr. 25, 2013

(65) Prior Publication Data
US 2014/0275412 A1    Sep. 18, 2014

(30) Foreign Application Priority Data

Oct. 21, 2011    (JP) ................ P2011-232025

(51) Int. Cl.
| | |
|---|---|
| C08G 63/12 | (2006.01) |
| C08J 3/03 | (2006.01) |
| C08G 63/20 | (2006.01) |
| G03G 9/08 | (2006.01) |
| G03G 9/087 | (2006.01) |

(52) U.S. Cl.
CPC ............... *C08G 63/12* (2013.01); *C08G 63/20* (2013.01); *C08J 3/03* (2013.01); *G03G 9/0804* (2013.01); *G03G 9/0806* (2013.01); *G03G 9/08755* (2013.01); *G03G 9/08795* (2013.01); *G03G 9/08797* (2013.01); *C08J 2367/00* (2013.01)

(58) Field of Classification Search
USPC ........ 525/437; 526/600; 106/31.85; 428/32.1
See application file for complete search history.

(56) References Cited

U.S. PATENT DOCUMENTS

| | | | |
|---|---|---|---|
| 4,200,560 A | 4/1980 | Kubo et al. | |
| 8,841,057 B2 * | 9/2014 | Aoki et al. | 430/109.4 |

| | | | |
|---|---|---|---|
| 2003/0224278 A1 | 12/2003 | Shirai et al. | |
| 2008/0025754 A1 | 1/2008 | Ishiyama et al. | |
| 2009/0305158 A1 | 12/2009 | Ono et al. | |
| 2013/0041125 A1 | 2/2013 | Hishida et al. | |

FOREIGN PATENT DOCUMENTS

| | | |
|---|---|---|
| CN | 101681136 A | 3/2010 |
| EP | 1479709 A1 | 11/2004 |
| JP | S53-127595 A | 11/1978 |
| JP | S54-045398 A | 4/1979 |
| JP | S61-124686 A | 6/1986 |
| JP | 62-078568 A | 4/1987 |
| JP | 62-178278 A | 8/1987 |
| JP | H4-240660 A | 8/1992 |
| JP | H5-027478 A | 2/1993 |
| JP | 2003-337443 A | 11/2003 |
| JP | 2004-346320 A | 12/2004 |
| JP | 2006-243715 A | 9/2006 |
| JP | 2007-011307 A | 1/2007 |
| JP | 2007-127776 A | 5/2007 |
| JP | 2008-033057 A | 2/2008 |
| JP | 2011-116997 A | 6/2011 |
| WO | WO2010/050023 * | 5/2010 |
| WO | WO 2011/132318 A1 | 10/2011 |
| WO | WO 2011/132319 A1 | 10/2011 |

OTHER PUBLICATIONS

International Search Report, International Application No. PCT/JP2012/076837, mailed Jan. 22, 2013.
International Preliminary Report on Patentability, Application No. PCT/JP2012/076837, mailed May 1, 2014.
European Patent Office; Extended Search Report in EP Patent Application No. 12841829.0 (Jun. 9, 2015).

* cited by examiner

*Primary Examiner* — Tae H Yoon
(74) *Attorney, Agent, or Firm* — Leydig, Voit & Mayer, Ltd.

(57) ABSTRACT

An amorphous polyester resin of the invention is obtained by reaction between a polyester resin (A), obtained by reaction between a polyhydric alcohol component and a first poly-carboxylic acid component, either or both including a 3 or higher valent component, and having a weight-average molecular weight of 6,000 to 40,000 and a hydroxyl value of 15 to 70 mgKOH/g, and a second poly-carboxylic acid component (a), under conditions satisfying the following equations (1), (2) and (3), and the amorphous polyester resin satisfying the following equation (4).

$$(AV_B - AV_A)/AV_a = 0.5\text{-}0.7 \qquad (1)$$

$$Mw_B/Mw_A = 1.1\text{-}2.0 \qquad (2)$$

$$OHV_B/AV_B = 1.0\text{-}6.0 \qquad (3)$$

$$Mw_B/Mn_B = 3.0\text{-}15.0 \qquad (4)$$

10 Claims, No Drawings

NON-CRYSTALLINE POLYESTER RESIN, AND BINDER RESIN AND BINDER RESIN DISPERSION FOR TONER

This application is the U.S. National Phase Application of the PCT/JP2012/076837, filed Oct. 17, 2012, which claims priority to Japan Patent Application No. P2011-232025, filed Oct. 21, 2011, the contents of each of these applications being incorporated by reference herein in their entireties for all purposes.

TECHNICAL FIELD

The present invention relates to an amorphous polyester resin, and to a binder resin and a binder resin dispersion for toner.

BACKGROUND ART

In recent years, with the development of OA appliances and the increasingly widespread use of computers, it is becoming common for ordinary households, personal offices and office units to carry out high-resolution commercial printing such as high-resolution color photograph printing, posters, pamphlets and the like, which conventionally had been done in specialized printing works, and demand is increasing for higher-quality and higher-speed printing techniques.

Such printing techniques that are employed include printing techniques based on electrostatic charge image development, such as electrophotographic methods, electrostatic recording methods and electrostatic printing methods. Generally speaking, fixed images are formed through a plurality of steps in which a photoconductive substance is used to form an electrostatic charge image on a photosensitive body by various means, the electrostatic charge image is then developed with toner, and the toner image is transferred to a print medium such as paper and heated and pressed with a roller to fix the image. The toner remaining on the photosensitive body is cleaned off if necessary by any of various methods and the aforementioned plurality of steps are repeated to accomplish printing.

Recently in the field of electrophotography, there is ever increasing demand not only for higher speed and higher reliability of devices but also for high image quality and color tone for copies that are equivalent to those of printed matter, and there is a need for toner having a high hot offset-generating temperature (excellent hot offset resistance) and excellent image gloss properties (gloss), in order to satisfy such demand. With the increasing importance of energy savings in recent years, it has become a major goal to reduce power consumption in the fixing step, which requires the highest electric power consumption during the electrophotography process. Therefore, toners with low fixing temperatures, i.e. toners with excellent low-temperature fixing properties, are desired.

In the past, polyester resins have been used as binders to improve the low-temperature fixing properties of toners (see Patent documents 1 and 2). Also, binder resins comprising crystalline polyesters and amorphous polyesters have been proposed with the aim of obtaining an excellent low-temperature fixing property (see Patent document 3). In addition, in order to ensure OHP translucency, fixing properties and offset resistance, there has been disclosed an image-fixing method employing color toner comprising, as the binder component, a resin having a number-average molecular weight Mn of 1,000 to 4,000, and a weight-average molecular weight Mw and number-average molecular weight Mn ratio, Mw/Mn, of 45 or greater, as measured by gel permeation chromatography (hereunder, GPC) (see Patent document 4).

On the other hand, as the particle diameter of toner continues to decrease with advancing high image quality, blocking during toner storage has become a problem. With toner having a low fixing temperature, a greater disadvantage is presented in terms of blocking resistance. Research has long been conducted on toner for electrostatic image development exhibiting excellent hot storage properties. For example, for production of chemical toner suited for small toner particle diameters, there has been disclosed a method for producing toner by subjecting an amorphous polyester resin and a crystalline polyester resin dissolved in an organic solvent to phase inversion emulsification in an aqueous medium, and aggregating and coalescing the obtained resin particle dispersion (see Patent document 5).

CITATION LIST

Patent Literature

[Patent document 1] Japanese Unexamined Patent Application Publication SHO No. 62-78568
[Patent document 2] Japanese Unexamined Patent Application Publication SHO No. 62-178278
[Patent document 3] Japanese Unexamined Patent Application Publication No. 2003-337443
[Patent document 4] Japanese Unexamined Patent Application Publication HEI No. 4-240660
[Patent document 5] Japanese Unexamined Patent Application Publication No. 2008-33057

SUMMARY OF INVENTION

Technical Problem

However, even the aforementioned conventional binder resins are still not satisfactory for achieving further speed increase and energy savings for devices, and higher quality of images. For example, the glass transition point or melting temperature of the polyester resin must be lowered in order to improve the low-temperature fixing property, and this has required a lower average molecular weight for the polyester resin. On the other hand, obtaining satisfactory hot offset resistance requires that a suitable melt viscosity be maintained even at high temperatures, and it has therefore been necessary to increase the average molecular weight of the polyester resin. Thus, the required properties are contradictory, even for this single example of the average molecular weight of the polyester resin. Therefore, it has been difficult to highly achieve both of the hot offset resistance and storability of toner, and the low-temperature fixing property.

It is an object of the present invention to provide an amorphous polyester resin that can be used to produce a toner for electrostatic image development having both of an excellent low-temperature fixing property, and hot offset resistance and storability (blocking resistance), and, having an excellent image gloss property (gloss), as well as a toner binder resin and a binder resin dispersion using the same.

Solution to Problem

As a result of diligent research with the aim of solving the aforementioned problems, the present inventors have completed this invention upon finding that a specific polyester resin can satisfy all of the properties mentioned above.

Specifically, the invention provides an amorphous polyester resin obtained by reaction between a polyester resin (A), obtained by reaction between a polyhydric alcohol component and a first poly-carboxylic acid component, either or both including a 3 or higher valent component, and having a weight-average molecular weight of 6,000 to 40,000 and a hydroxyl value of 15 to 70 mgKOH/g, and a second poly-carboxylic acid component (a), under conditions satisfying the following equations (1), (2) and (3), and the amorphous polyester resin satisfying the following equation (4).

$$(AV_B - AV_A)/AV_a = 0.5\text{-}0.7 \quad (1)$$

$$Mw_B/Mw_A = 1.1\text{-}2.0 \quad (2)$$

$$OHV_B/AV_B = 1.0\text{-}6.0 \quad (3)$$

$$Mw_B/Mn_B = 3.0\text{-}15.0 \quad (4)$$

[In the equations, $AV_B$, $OHV_B$, $Mw_B$ and $Mn_B$ respectively represent an acid value, a hydroxyl value, a weight-average molecular weight and a number-average molecular weight of the amorphous polyester resin, and $AV_A$ and $Mw_A$ respectively represent an acid value and a weight-average molecular weight of the polyester resin (A), where $AV_a$ represents a theoretical acid value of the second poly-carboxylic acid component (a).]

Throughout the present specification, the term "poly-carboxylic acid component" will include poly-carboxylic acids, anhydrides of the acids, and lower alkyl (preferably C1-3) esters of the acids, and the component may contain one or more different types thereof.

With the amorphous polyester resin of the invention, it is possible to produce a toner for electrostatic image development having both of an excellent low-temperature fixing property, and hot offset resistance and storability (blocking resistance), and having an excellent image gloss property (gloss).

The amorphous polyester resin of the invention preferably has a weight-average molecular weight of 8,000 to 50,000.

In the amorphous polyester resin of the invention, the polyester resin (A) is preferably one obtained by reacting the aforementioned polyhydric alcohol component and the aforementioned first poly-carboxylic acid component under conditions satisfying either or both of the following (5) and (6).
(5) The polyhydric alcohol component contains a 3 or higher hydric polyhydric alcohol at 0.3 to 15 mol % based on the total amount of the polyhydric alcohol component.
(6) The first poly-carboxylic acid component contains a 3 or higher carboxylic poly-carboxylic acid component at 0.3 to 20 mol % based on the total amount of the first poly-carboxylic acid component.

The amorphous polyester resin obtained under these conditions can have a suitable molecular weight between crosslinking points, and when used as a binder resin for toner, it can exhibit higher levels of both of the contradictory properties of low-temperature fixing and hot offset resistance.

In the reaction between the polyester resin (A) and the second poly-carboxylic acid component (a), the mass ratio of the polyester resin (A) and the second poly-carboxylic acid component (a) is preferably 99.5/0.5 to 90/10. With an amorphous polyester resin obtained under such conditions, it has an excellent low-temperature fixing property and image gloss property (gloss) when used as a binder resin for toner, and can more reliably produce a toner having satisfactory hot offset resistance and storability.

The amorphous polyester resin of the invention preferably has an acid value of 4 to 25 mgKOH/g and a hydroxyl value of 10 to 60 mgKOH/g. If the acid value of the amorphous polyester resin is within this range, it will be easier to control the particle diameter when the resin is emulsified and reaggregated to produce chemical toner. Also, if the hydroxyl value of the amorphous polyester resin is within the aforementioned range, it is possible to improve not only the dispersibility of the amorphous polyester resin itself, but also the dispersibility of the other components such as the crystalline resin, pigment and wax in the binder resin dispersion for toner during granulation of the toner particles, which consequently tends to result in more satisfactory storability (blocking resistance) of the toner. In addition, satisfying both conditions allows a toner to be obtained with more excellent low-temperature fixing and electrostatic properties.

Preferably, the amorphous polyester resin of the invention has a glass transition point of 55° C. to 75° C., and a temperature at a melt viscosity of 10,000 Pa·s is 95° C. to 125° C. If the glass transition point is within the range specified above, it will be easier to obtain a toner having excellent storability, low-temperature fixing properties and gloss. Also, if the temperature at which the melt viscosity is 10,000 Pa·s is within the range specified above, it will be easier to obtain a toner with satisfactory low-temperature fixing properties and hot offset resistance.

In the amorphous polyester resin of the invention, the polyhydric alcohol component preferably comprises a bisphenol A alkylene oxide adduct and/or a bisphenol S alkylene oxide adduct. With an amorphous polyester resin obtained under such conditions, it is possible to obtain toner with even more greatly improved hot offset resistance and storability when used as a binder resin for toner.

In the amorphous polyester resin of the invention, the first poly-carboxylic acid component preferably contains the reaction product of an aromatic poly-carboxylic acid component and a C2-4 glycol. Such conditions minimize sublimation of the aromatic poly-carboxylic acid component during production of the amorphous polyester resin, and result in a uniform reaction system, thus allowing easier control of the higher-order structure of the resin and thus stable production. Also, the amorphous polyester resin having such the above constitution can exhibit even higher levels of both of the contradictory performance aspects of low-temperature fixing and hot offset resistance, when used as a binder resin for toner.

The invention further provides a binder resin for toner containing the amorphous polyester resin according to the invention.

The invention still further provides a binder resin dispersion for toner wherein the amorphous polyester resin of the invention is dispersed or emulsified in an aqueous medium.

Advantageous Effects of Invention

According to the invention it is possible to provide an amorphous polyester resin that can be used to produce a toner for electrostatic image development having both of an excellent low-temperature fixing property, and hot offset resistance and storability (blocking resistance), and, having an excellent image gloss property (gloss), as well as a binder resin for toner and a binder resin dispersion using the same.

DESCRIPTION OF EMBODIMENTS

According to the invention, an "amorphous" polyester resin is a polyester resin that does not exhibit a distinct crystal melting endothermic peak, and has a melt entropy of 5 mJ/mg or less, as determined from the melting endothermic peak area of its DSC (differential scanning calorimetry) curve. In contrast, a "crystalline" polyester resin is a polyester resin that exhibits a distinct crystal melting endothermic peak and has a melt entropy of greater than 5 mJ/mg. The value of the melt entropy is determined using indium as the standard substance.

A crystalline polyester resin with a distinct melting point has a storage elastic modulus in dynamic viscoelasticity measurement that falls drastically at temperatures below the melting point, and therefore its use alone as a binder resin in a toner for electrostatic image development often results in penetration into the print medium, causing fixing defects and image bleeding.

On the other hand, an amorphous polyester resin has a rubbery region in which it does not exhibit a distinct melting point, in a temperature range above its glass transition point, and it therefore tends to easily maintain its storage elastic modulus until immediately before initial flow of the resin. The polyester resin of the invention is such an amorphous polyester resin.

The term "low-temperature fixing property", for the purpose of the invention, refers to the resistance to troubles attributed mainly to toner (for example, poor melting of the toner, blur and white spots in printing due to melting spots, uneven color, and fixing defects) when it is fixed by heating at low temperature, i.e. at a temperature of below about 130° C. A lower minimum temperature at which toner fixes (also called as "minimum fixing temperature") corresponds to a more satisfactory low-temperature fixing property.

The term "hot offset resistance", for the purpose of the invention, refers to resistance to troubles caused mainly by the toner during printing in a high temperature state (for example, printing thin spots and unevenness, bleeding, toner blotting, and fusion of toner onto the rollers, that result from fixing defects when the toner itself breaks up between the print medium, the toner and the roller). Printing in a high temperature state is printing with heat accumulation inside the printer as a result of continuous printing or high-speed printing, causing the members such as a transfer roller, a heating roller, a fixing roller and the like to a high temperature state. The hot offset resistance is more satisfactory with a higher maximum fixing temperature of the toner.

The term "storability (blocking resistance)", for the purpose of the invention, refers to the storage stability of the toner. When a toner cartridge is placed in a harsh environment, such as during transport or storage in the summer season, the toner particles tend to coalesce or aggregate together, and when this is significant, the toner will fail to flow even with vibration, often making it unusable as toner. Storability (blocking resistance) is the resistance to this type of trouble.

An amorphous polyester resin according to the invention will now be explained.

The amorphous polyester resin according to this embodiment (hereunder also referred to as "amorphous polyester resin (B)") is obtained by reaction between a polyester resin (A), obtained by reaction between a polyhydric alcohol component and a first poly-carboxylic acid component, either or both including a 3 or higher valent component, and having a weight-average molecular weight of 6,000 to 40,000 and a hydroxyl value of 15 to 70 mgKOH/g, and a second poly-carboxylic acid component (a), under conditions satisfying the following equations (1), (2) and (3), and the amorphous polyester resin satisfying the following equation (4).

$(AV_B - AV_A)/AV_a = 0.5\text{-}0.7$ (1)

$Mw_B/Mw_A = 1.1\text{-}2.0$ (2)

$OHV_B/AV_B = 1.0\text{-}6.0$ (3)

$Mw_B/Mn_B = 3.0\text{-}15.0$ (4)

In the equations, $AV_B$, $OHV_B$, $Mw_B$ and $Mn_B$ respectively represent an acid value, a hydroxyl value, a weight-average molecular weight and a number-average molecular weight of the amorphous polyester resin, and $AV_A$ and $Mw_A$ respectively represent an acid value and a weight-average molecular weight of the polyester resin (A), where $AV_a$ represents a theoretical acid value of the second poly-carboxylic acid component (a).

The polyhydric alcohol component to be used for production of the polyester resin (A) preferably contains a polyhydric alcohol that is an alkylene oxide adduct of bisphenol A, from the viewpoint of facilitating adjustment of the glass transition point and resulting in satisfactory hot offset resistance and storability.

In this case, the polyhydric alcohol component preferably contains the alkylene oxide adduct of bisphenol A at 50 mol % or greater and more preferably 60 mol % or greater, with respect to 100 mol % of the total polyhydric alcohol component (the total amount of structural units derived from the alcohol composing the polyester resin (A)). The polyhydric alcohol component may also consist of 100 mol % of an alkylene oxide adduct of bisphenol A.

The alkylene oxide for the alkylene oxide adduct of bisphenol A is preferably a C2-4 alkylene oxide. The number of moles of addition of the alkylene oxide is preferably 2 to 5 mol and more preferably 2 to 4.5 mol with respect to 1 mol of bisphenol A. The form of addition of the alkylene oxide may be single addition of one type of alkylene oxide, or it may be addition of a combination of two or more different alkylene oxides. If the number of moles of addition is less than 2 mol, phenolic hydroxyl groups will tend to remain, potentially inhibiting reaction between the polyhydric alcohol component and the first poly-carboxylic acid component, while if it exceeds 5 mol, the glass transition point may be lowered, tending to lower the hot offset resistance and storability.

For this embodiment, from the viewpoint of adjusting the glass transition point of the amorphous polyester resin, it is particularly preferred to use a combination of an ethylene oxide adduct and a propylene oxide adduct of bisphenol A, in which case the use ratio is preferably (ethylene oxide adduct): (propylene oxide adduct) (molar ratio) of 10:90 to 50:50 and more preferably 20:80 to 40:60.

Also, the polyhydric alcohol component preferably contains an alkylene oxide adduct of bisphenol S, from the viewpoint of facilitating adjustment of the glass transition point and resulting in satisfactory hot offset resistance and storability. Furthermore, in order to further improve the hot offset resistance and storability (blocking resistance), the polyhydric alcohol component more preferably contains an alkylene oxide adduct of bisphenol A and an alkylene oxide adduct of bisphenol S.

When the polyhydric alcohol component contains an alkylene oxide adduct of bisphenol S, the polyhydric alcohol component contains the alkylene oxide adduct of bisphenol S at preferably 2 to 40 mol % and more preferably 5 to 30 mol %, with respect to 100 mol % of the total polyhydric alcohol component (the total amount of structural units derived from the alcohol composing the polyester resin (A)). The preferred ranges for the number of carbons and the number of moles of addition of the alkylene oxide for the alkylene oxide adduct of bisphenol S are the same as for the alkylene oxide adduct of bisphenol A.

Examples of polyhydric alcohol components other than those mentioned above to be used in combination include aliphatic dihydric alcohols such as ethylene glycol, diethylene glycol, triethylene glycol, propylene glycol, 1,3-propanediol, butanediol, pentanediol, hexanediol, heptanediol, nonanediol, decanediol and neopentyl glycol; hydrogenated bisphenol A, hydrogenated bisphenol S and their alkylene oxide adducts; alicyclic dihydric alcohols such as cyclohexanedimethanol; and 3 or higher hydric polyhydric alcohols such as glycerin, trimethylolpropane and pentaerythritol.

When the polyhydric alcohol component contains a 3 or higher hydric polyhydric alcohol, the polyhydric alcohol component contains the 3 or higher hydric polyhydric alcohol at preferably 0.3 to 15 mol % and more preferably 3 to 10 mol % based on the total amount of the polyhydric alcohol component. The 3 or higher hydric polyhydric alcohol is preferably trimethylolpropane, from the viewpoint of facilitating adjustment of the molecular weight distribution and glass transition point of the amorphous polyester resin (B).

The first poly-carboxylic acid component to be used for production of the polyester resin (A) may contain one or more compounds selected from the group consisting of poly-carboxylic acids, their acid anhydrides, and their acid lower alkyl (preferably C1-3) esters. The first poly-carboxylic acid component is preferably an aromatic poly-carboxylic acid component. Here, an aromatic poly-carboxylic acid component is a component including one or more compounds selected from the group consisting of aromatic poly-carboxylic acids, their acid anhydrides, and their acid lower alkyl (preferably C1-3) esters. Aromatic poly-carboxylic acids include aromatic dicarboxylic acids such as phthalic acid, terephthalic acid, isophthalic acid and naphthalenedicarboxylic acid; and a 3 or higher carboxylic aromatic poly-carboxylic acids such as trimellitic acid and pyromellitic acid.

The first poly-carboxylic acid component may also contain the reaction product of an aromatic poly-carboxylic acid component and a C2-4 glycol. The aromatic poly-carboxylic acid component here has the same definition as above. Examples of aromatic poly-carboxylic acids include the same compounds mentioned above.

When the first poly-carboxylic acid component contains the aforementioned reaction product, the aromatic poly-carboxylic acid component to be supplied to the reaction is preferably an aromatic dicarboxylic acid component. An aromatic dicarboxylic acid component is a component including one or more compounds selected from the group consisting of aromatic dicarboxylic acids, their acid anhydrides, and their acid lower alkyl (preferably C1-3) esters. Examples of aromatic dicarboxylic acids include the same compounds mentioned above.

Incidentally, C2-4 glycols include alkylene glycols such as ethylene glycol, propylene glycol, 1,3-propanediol and butanediol, and glycols such as diethylene glycol. It is more preferred to use C2-3 alkylene glycols for satisfactory reactivity, i.e. transesterification reaction efficiency, during production of the polyester resin (A).

The reaction product between the aromatic dicarboxylic acid component and the C2-3 alkylene glycol may be represented by the following general formula [I].

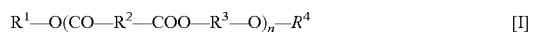

(In formula [I], $R^1$ represents a C2-3 alkylene glycol residue (that is, a group derived by removing one hydroxyl group from a C2-3 alkylene glycol, such as hydroxyethyl and hydroxypropyl), hydrogen or a lower alkyl group (preferably C1-3), $R^2$ represents an aromatic dicarboxylic acid residue (that is, a group derived by removing two carboxyl groups from an aromatic dicarboxylic acid, such as phenylene and naphthylene), $R^3$ represents a C2-3 alkylene group, $R^4$ represents hydrogen or a monoester group come from an aromatic dicarboxylic acid component (that is, a group derived by removing one hydroxyl group from an aromatic dicarboxylic acid, or a group derived by removing one alkoxy group from a lower alkyl (preferably C1-3) ester of an aromatic dicarboxylic acid), and n is the number of repeating units and represents an integer of 1 to 12.).

When the first poly-carboxylic acid component is an aromatic poly-carboxylic acid component, the first poly-carboxylic acid component contains the aromatic poly-carboxylic acid component at preferably 60 mol % or greater, more preferably 70 to 98 mol % and even more preferably 80 to 95 mol %, with respect to 100 mol % as the total first poly-carboxylic acid component. The first poly-carboxylic acid component may also consist of 100 mol % of an aromatic poly-carboxylic acid component. If the proportion is less than 60 mol %, the glass transition point of the resulting amorphous polyester resin will tend to be 55° C. or lower, tending to result in insufficient hot offset resistance and blocking resistance.

When the first poly-carboxylic acid component contains the reaction product of an aromatic poly-carboxylic acid component and a C2-4 glycol, the content of the aromatic poly-carboxylic acid component in the first poly-carboxylic acid component is calculated by adding the number of moles of aromatic poly-carboxylic acid component provided to the reaction for obtaining the aforementioned reaction product, to the aromatic poly-carboxylic acid component content of the first poly-carboxylic acid component.

As other poly-carboxylic acid components there may be used straight-chain or branched-chain aliphatic poly-carboxylic acids such as oxalic acid, malonic acid, succinic acid, maleic acid, glutaric acid, adipic acid, pimelic acid, suberic acid, azelaic acid, sebacic acid, dodecanedioic acid, 2-ethylhexylsuccinic acid, oleylsuccinic acid, 2-dodecenylsuccinic acid and tetrapropenylsuccinic acid; alicyclic poly-carboxylic acids such as 1,2-cyclohexanedicarboxylic acid, 1,3-cyclohexanedicarboxylic acid, 1,2,4-cyclohexanetricarboxylic acid, 1,3,5-cyclohexanetricarboxylic acid, 1,2,4,5-cyclohexanetetracarboxylic acid and 1,2,3,4,5,6-cyclohexanehexacarboxylic acid; and anhydrides of these acids and lower alkyl (preferably C1-3) esters of these acids, in amounts that do not interfere with the effect of the invention. However, the content of such other poly-carboxylic acids is preferably 40 mol % or less and more preferably 30 mol % or less, with respect to the total number of moles of the poly-carboxylic acid component used for production of the polyester resin (A). If the proportion exceeds 40 mol %, the glass transition point of the amorphous polyester resin will tend to be lowered.

When the first poly-carboxylic acid component contains a 3 or higher carboxylic poly-carboxylic acid component, the first poly-carboxylic acid component preferably contains the 3 or higher carboxylic poly-carboxylic acid component at preferably 0.3 to 20 mol % and more preferably 3 to 10 mol %, based on the total amount of the first poly-carboxylic acid component.

From the viewpoint of hot offset resistance, the 3 or higher carboxylic poly-carboxylic acid component is preferably a 3 or higher carboxylic aromatic poly-carboxylic acid component. As 3 or higher carboxylic aromatic poly-carboxylic acid components there are preferred trimellitic acid, trimellitic anhydride and alkyl trimellitate esters.

As explained above, a 3 or higher carboxylic poly-carboxylic acid component and/or 3 or higher hydric polyhydric alcohol are used for production of the polyester resin (A), but if the contents of the 3 or higher valent components are less than the ranges specified above, increase in the molecular weight will be low during reaction between the polyester resin (A) and the second poly-carboxylic acid component (a) described below, and it will tend to be difficult to control the value of $Mw_B/Mw_A$. Conversely, if the contents are above the ranges specified above, increase in the molecular weight will be high during reaction between the polyester resin (A) and the second poly-carboxylic acid component (a) described below, and it will either be difficult to control the value of $Mw_B/Mw_A$, or the viscosity may increase during the reaction, thereby impeding production. Also, contents within the specified ranges will allow the resulting amorphous polyester resin (B) to have a suitable molecular weight between crosslinking points, and will tend to permit both of the contradictory performances of low-temperature fixing property and hot offset resistance to be achieved.

For production of a polyester resin (A) for this embodiment, the equivalent ratio ([OH]:[COOH]) of the hydroxyl groups [OH] of the polyhydric alcohol component and the carboxyl groups [COOH] of the first poly-carboxylic acid component is preferably 100:50 to 100:90 and more preferably 100:60 to 100:80. Here, "carboxyl groups" refers not only to —COOH but also to portions having an acid anhydride structure and portions having a lower alkyl ester structure. The mixing ratio of the polyhydric alcohol component and the first poly-carboxylic acid component is adjusted so that the equivalent ratio of the hydroxyl groups and carboxyl groups satisfies the range specified above.

A solvent may be used for production of a polyester resin (A) for this embodiment, from the viewpoint of adjusting the reaction rate during reaction between the polyhydric alcohol component and the first poly-carboxylic acid component. However, when the reaction is to be conducted using a glycol such as ethylene glycol as the solvent, preferably not all of it is distilled off but rather 0.1 to 20 mass % and preferably 3 to 15 mass % of the amount used is incorporated into the polyester resin (A) backbone, from the viewpoint of facilitating adjustment of the hydroxyl value and the acid value.

When a glycol such as ethylene glycol is to be used as the solvent, or when a reaction product of an aromatic poly-carboxylic acid component and a C2-4 glycol is to be used, the equivalent ratio [OH]:[COOH] is preferably 100:50 to 100:115 and more preferably 100:60 to 100:100. Here, [OH] is the value calculated without considering the glycol component used as the solvent, and [COOH] is the value calculated considering the reaction product between the aromatic poly-carboxylic acid component and the C2-4 glycol.

The polyester resin (A) is obtained by mixing the polyhydric alcohol component and the first poly-carboxylic acid component in a prescribed proportion in the presence of a catalyst, and heating the mixture for condensation reaction. The reaction will usually be carried out in the presence of a catalyst, under temperature conditions of 130° C. to 280° C. and preferably 150° C. to 270° C., under ordinary pressure, under reduced pressure or under pressurization, for preferably 5 to 15 hours.

The catalyst used for production of the polyester resin (A) may be a catalyst that is known in the prior art, such as a transesterification catalyst, for example, antimony trioxide, an organic tin-based polymerization catalyst such as dibutyltin oxide, a germanium-based catalyst, an inorganic titanium-based catalyst, an organic titanium-based catalyst, an organic cobalt-based catalyst, zinc acetate, manganese acetate, and the like, especially, with germanium-based catalysts, inorganic titanium-based catalysts and organic titanium-based catalysts being preferred for use.

Organic titanium-based catalysts include titanium alkoxide, titanium potassium oxalate, titanium terephthalate, the catalysts mentioned in Japanese Unexamined Patent Application Publication No. 2006-243715 (titanium dihydroxybis (triethanolaminate), titanium monohydroxytris(triethanolaminate), and their intramolecular condensation products), and the catalysts mentioned in Japanese Unexamined Patent Application Publication No. 2007-11307 (titanium tributoxyterephthalate, titanium triisopropoxyterephthalate and titanium diisopropoxyditerephthalate).

According to the invention, an antioxidant may be added before or after production of the polyester resin (A), in order to prevent coloration or thermal decomposition. Such antioxidants are not particularly restricted, and examples include hindered phenol-based antioxidants, phosphite-based antioxidants and sulfur-containing antioxidants.

The polyester resin (A) obtained by reacting the polyhydric alcohol component and the first poly-carboxylic acid component has a hydroxyl value ($OHV_A$) of 15 to 70 mgKOH/g and preferably has a hydroxyl value of 15 to 50 mgKOH/g, from the viewpoint of controlling reaction with the second poly-carboxylic acid component (a). If the hydroxyl value of the polyester resin (A) is less than 15 mgKOH/g or greater than 70 mgKOH/g, it will tend to be difficult to control the weight-average molecular weight of the amorphous polyester resin (B) to the preferred range.

The polyester resin (A) preferably has an acid value ($AV_A$) of 5 mgKOH/g or less and more preferably has an acid value of 4 mgKOH/g or less, from the viewpoint of controlling reaction with the second poly-carboxylic acid component (a). If the acid value is greater than 5 mgKOH/g the polyester resin (A) will readily react with itself, and it will tend to be difficult to control the molecular weight and acid value after reaction with the second poly-carboxylic acid component (a).

The weight-average molecular weight ($Mw_A$) of the polyester resin (A) is 6,000 to 40,000, preferably 8,000 to 40,000, more preferably 9,000 to 38,000 and even more preferably 10,000 to 35,000. If $Mw_A$ is less than 6,000, $(AV_B-AV_A)/AV_a$ (the degree of modification) will be reduced and the hot offset resistance of the amorphous polyester resin (B) will tend to be lower, and if it is greater than 40,000, the low-temperature fixing property and image gloss property (gloss) will tend to be reduced.

Also, the content of components in the polyester resin (A) with a weight-average molecular weight of 500 or less is preferably 10.0 mass % or less, more preferably 8.0 mass % or less and even more preferably 6.0 mass % or less. This will facilitate control of the reaction between the polyester resin (A) and the second poly-carboxylic acid component (a), and will tend to make it easier to limit the content of components with weight-average molecular weight of 500 or less in the resulting amorphous polyester resin (B).

The polyester resin (B) of this embodiment is obtained by reaction between the polyester resin (A) and the second poly-carboxylic acid component (a).

The second poly-carboxylic acid component (a) may contain one or more compounds selected from the group consisting of dicarboxylic or tricarboxylic poly-carboxylic acids, anhydrides of such acids, and C1-3 alkyl esters of such acids.

Examples for the second poly-carboxylic acid component (a) include the same ones as for the first poly-carboxylic acid component for production of the polyester resin (A). For easier control of the glass transition point of the obtained amorphous polyester resin (B), the second poly-carboxylic acid component (a) preferably contains an aromatic poly-carboxylic acid component, i.e. one or more compounds selected from the group consisting of aromatic poly-carboxylic acids, anhydrides of such acids and C1-3 alkyl esters of such acids, and more preferably it contains an anhydride of an aromatic poly-carboxylic acid.

The mixing ratio (A):(a) of the polyester resin (A) and the second poly-carboxylic acid component (a), used for production of the amorphous polyester resin (B) is, in terms of mass ratio, preferably 99.5:0.5 to 90:10 (reaction mass ratio [(A)/(a)]=99.5/0.5 to 90/10) and more preferably 99:1 to 95:5 (reaction mass ratio [(A)/(a)]=99/1 to 95/5). If the reaction mass ratio [(A)/(a)] is greater than 99.5/0.5, the $OHV_B/AV_B$ ratio of the amorphous polyester resin (B) will increase, tending to lower the hot offset resistance of the toner. If the reaction mass ratio [(A)/(a)] is smaller than 90/10, the amount of the second poly-carboxylic acid component (a) will be greater and the hygroscopicity of the toner will increase, thereby lowering the electrostatic properties and also causing more of the unreacted second poly-carboxylic acid component (a) to remain, such that the glass transition point will tend to be lowered and the storability will tend to decrease.

The reaction for production of the amorphous polyester resin (B) is carried out under temperature conditions of preferably 130° C. to 250° C. and more preferably 170° C. to 230° C., under ordinary pressure, under reduced pressure or under pressure, and preferably for 30 to 150 minutes. From the viewpoint of reaction control, the reaction is preferably carried out at ordinary pressure, and if necessary, it may be carried out in the presence of a monocarboxylic acid such as benzoic acid, salicylic acid, paraoxybenzoic acid, toluenecarboxylic acid, acetic acid, propionic acid, stearic acid and the like, an acid anhydride thereof (for example, benzoic anhydride), or a lower alkyl (preferably C1-3) ester thereof (for example, ethyl benzoate), and in the presence of the catalyst used for production of the polyester resin (A). Alternatively, the reaction product from production of polyester resin (A) may be heated to the prescribed reaction temperature and cooled, and then the second poly-carboxylic acid component (a) added thereto and reacted.

For this embodiment, the polyester resin (A) and the second poly-carboxylic acid component (a) are reacted under conditions satisfying the following equations (1), (2) and (3), to obtain an amorphous polyester resin (B) satisfying the following equation (4).

$$(AV_B-AV_A)/AV_a=0.5\text{-}0.7 \quad (1)$$

$$Mw_B/Mw_A=1.1\text{-}2.0 \quad (2)$$

$$OHV_B/AV_B=1.0\text{-}6.0 \quad (3)$$

$$Mw_B/Mn_B=3.0\text{-}15.0 \quad (4)$$

In the equations, $AV_B$, $OHV_B$, $Mw_B$ and $Mn_B$ respectively represent an acid value, a hydroxyl value, a weight-average molecular weight and a number-average molecular weight of the amorphous polyester resin (B), and $AV_A$ and $Mw_A$ respectively represent an acid value and a weight-average molecular weight of the polyester resin (A), where $AV_a$ represents a theoretical acid value of the second poly-carboxylic acid component (a).

The theoretical acid value $AV_a$ is calculated using the following equations.

$$AV_a=AV_a'\times W_a/(W_A+W_a)$$

$$AV_a=W_a/Mw_a\times \text{valency}\times 56.1\times 1000/W_a$$

Here, $AV_a'$ represents the acid value of the second poly-carboxylic acid component (a), $W_a$ represents the weight of the second poly-carboxylic acid component (a) supplied to the reaction, and $W_A$ represents the weight of the polyester resin (A) supplied to the reaction.

The ratio $(AV_B-AV_A)/AV_a$ in equation (1) may be considered as the rate of unreacted second poly-carboxylic acid component (a), and equation (1) indicates that 50% to 70% of the carboxyl groups among the carboxyl groups of the second poly-carboxylic acid component (a) are unreacted. Here, "carboxyl groups" refers not only to —COOH but also to portions having an anhydride structure and portions having a lower alkyl ester structure. If the rate of unreacted second poly-carboxylic acid component (a) is less than 50%, progress of the crosslinking reaction will tend to excessively increase the viscoelasticity of the resin and lower the low-temperature fixing property and gloss. If the rate of unreacted second poly-carboxylic acid component (a) is greater than 70%, the small number of crosslinked sections will lower the hot offset resistance and storability, and the greater amount of unreacted second poly-carboxylic acid component (a) will cause bleed out of the toner on the particle surfaces, tending to result in lower blocking resistance. If the rate of unreacted second poly-carboxylic acid component (a) is 50% to 70%, instead of formation of a higher crosslinked structure there will be formed a structure with partial light crosslinking, or a branched structure. It will therefore be possible to obtain a tetrahydrofuran insoluble portion of 0.5 mass % or less in the amorphous polyester resin (B), and a polymer having carboxyl groups on the main chain of the polyester, or a polymer with many carboxyl groups per polymer molecule, will be obtainable, tending to result in satisfactory emulsifiability. The value of $(AV_B-AV_A)/AV_a$ is preferably 0.55 to 0.67.

The ratio $Mw_B/Mw_A$ in equation (2) can be considered to be the degree of molecular extension between before and after the reaction, and it represents to what extent the weight-average molecular weight is increased through the reaction of the polyester resin (A) with the second poly-carboxylic acid component (a). If $Mw_B/Mw_A$ is less than 1.1, the hot offset resistance and storability will tend to be lowered, and if it is greater than 2.0 the low-temperature fixing property and image gloss property (gloss) will tend to be lowered. The value of $Mw_B/Mw_A$ is preferably 1.2 to 1.6.

The ratio $OHV_B/AV_B$ in equation (3) is the ratio of the hydroxyl value and the acid value of the obtained amorphous polyester resin (B), and a specific method for satisfying the condition of equation (3) may be appropriate adjustment of the mixing proportion and rate of unreacted second poly-carboxylic acid component (a), based on the weight-average molecular weight ($Mw_A$) and acid value ($AV_A$) of the polyester resin (A). If the value of $OHV_B/AV_B$ is less than 1.0, the toner flow property will be poor and the storability (blocking resistance) reduced, while if it is greater than 6.0, the pigment dispersibility will be poor after producing the toner, and the coloring properties (color reproducibility and chroma) or image gloss property (gloss) will tend to be reduced.

If equations (1), (2) and (3) are satisfied in the reaction between the polyester resin (A) and the second poly-carboxylic acid component (a), it will be possible to obtain an amorphous polyester resin (B) that can yield a toner having excellent low-temperature fixing properties, image gloss properties (gloss), hot offset resistance and storability. In addition, when chemical toner is to be produced by an emulsification-aggregation method or the like, it is easier to form fine particles by satisfying equations (1) and (2).

Furthermore, by the amorphous polyester resin (B) satisfying equations (3) and (4), a toner with excellent low-temperature fixing properties, hot offset resistance and storability can be obtained. If the value of $Mw_B/Mn_B$ is less than 3.0, the reduction in toner viscosity with high temperature fixing will become notable and the hot offset resistance will be lowered, and if it is greater than 15.0, the molecular weight distribution will be too wide and it will be difficult to obtain a smooth fixed image surface, tending to lower the image gloss property (gloss).

As mentioned above, by controlling the reaction between the polyester resin (A) and the second poly-carboxylic acid component (a) so that equations (1) to (4) are satisfied, to produce an amorphous polyester (B), it is possible to obtain a toner for electrostatic image development having both excellent low-temperature fixing properties, and hot offset resistance and storability (blocking resistance), and having an excellent image gloss property (gloss).

The weight-average molecular weight $Mw_B$ of the amorphous polyester resin (B) of this embodiment is preferably 8,000 to 50,000 and more preferably 10,000 to 50,000. If the weight-average molecular weight ($Mw_B$) is less than 8,000, the hot offset resistance or storability will tend to be insufficient, and if it exceeds 50,000, this may lead to a reduced low-temperature fixing property or reduced gloss.

Also, the molecular weight between crosslinking points Mc determined by temperature dispersion measurement for the dynamic viscoelasticity of the amorphous polyester resin (B) is preferably $1.0 \times 10^5$ to $1.0 \times 10^8$, more preferably $3.0 \times 10^5$ to $8.0 \times 10^7$ and even more preferably $5.0 \times 10^5$ to $4.0 \times 10^7$. If the molecular weight between crosslinking points is less than $1.0 \times 10^5$, the rigidity of the amorphous polyester resin (B) will increase and the low-temperature fixing property or image gloss property will tend to be lowered. If the molecular weight between crosslinking points is greater than $1.0 \times 10^8$, the rigidity will tend to decrease and the low-temperature fixing property and image gloss property will be satisfactory, but the hot offset resistance and image intensity will tend to be lowered.

Also, the amorphous polyester resin (B) preferably has a content of 5.0 mass % or less for components with a weight-average molecular weight of up to 500. A large content of components with a weight-average molecular weight of up to 500 (polyester oligomers) will result in more bleed out of those components into the toner particle surface, tending to prevent sufficient improvement in the blocking resistance. Such components can be reduced by controlling the production conditions for the polyester resin (A), such as increasing the reaction temperature, reducing the pressure, or lengthening the reaction time.

Two or more different types of amorphous polyester resin (B) with different weight-average molecular weights may also be used in admixture. When two or more different types are mixed, the preferred combination is an amorphous polyester resin (B-1) with a weight-average molecular weight of 8,000 to 25,000 and an amorphous polyester resin (B-2) with a weight-average molecular weight of 25,000 to 50,000. The mixing ratio of the amorphous polyester resin (B-1) and the amorphous polyester resin (B-2) is, in terms of mass ratio, preferably 95:5 to 5:95, more preferably 90:10 to 40:60 and even more preferably 80:20 to 50:50. If the mixing ratio is in the range of 95:5 to 5:95, it will be possible to obtain a toner that is even more superior in terms of low-temperature fixing property and image gloss property (gloss), as well as having satisfactory hot offset resistance and storability.

The acid value of the amorphous polyester resin (B) is preferably 4 to 25 mgKOH/g, more preferably 5 to 15 mgKOH/g and even more preferably 5 to 13 mgKOH/g. If the acid value is less than 4 mgKOH/g, ion repulsion between the particles will be reduced due to the electrical charge of the toner surface, and problems such as toner coalescence or aggregation will more easily occur when it is exposed to high temperature conditions for prolonged periods, such as during storage, while the storability will also tend to be reduced. If the acid value is greater than 25 mgKOH/g, on the other hand, the hygroscopicity due to ionic functional groups will be increased and the blocking resistance may potentially be lowered, while the environmental stability of the toner (i.e. the stability of the electrostatic properties with variation in temperature or humidity) will be reduced, potentially leading to lower image quality caused by poor image formation. If the acid value is within the range of 4 to 25 mgKOH/g, it will tend to be easier to control the particle diameter, in the case of chemical toner prepared by emulsification and reaggregation of the resin.

The hydroxyl value of the amorphous polyester resin (B) is preferably 10 to 60 mgKOH/g and more preferably 10 to 40 mgKOH/g. If the hydroxyl value is less than 10 mgKOH/g, the electrostatic property of the toner will tend to be reduced, and specifically the build-up of the electrostatic charge rising property of the toner will tend to be poor, while if it is greater than 60 mgKOH/g, the hygroscopicity of the toner will increase to an extreme, tending to reduce the electrostatic property of the toner, and specifically tending to adversely affect the electrostatic retention of the toner.

The glass transition point of the amorphous polyester resin (B) is preferably 55° C. to 75° C. If the glass transition point is below 55° C. the storability will be insufficient, and if it is above 75° C. the low-temperature fixing property and image gloss property (gloss) may tend to be reduced.

The amorphous polyester resin (B) preferably has a temperature of 95° C. to 125° C. when the melt viscosity is 10,000 Pa·s. Within this temperature range, the low-temperature fixing property and hot offset resistance will be more satisfactory. More specifically, when this temperature is lower than 95° C., the viscosity of the binder resin will be too low during fixing, image bleeding will occur more readily due to excessive penetration into the print medium, and the hot offset resistance will tend to be reduced. On the other hand, when the temperature is higher than 125° C., the viscosity of the binder resin will become too high during fixing at low temperature, fixing defects will occur more readily, and the low-temperature fixing property will tend to be reduced.

The amorphous polyester resin (B) preferably has a dielectric loss tangent tan δ of between 0.0015 and 0.0060 at an application frequency of 1 kHz, under conditions of 25° C. temperature, 65% RH. If the dielectric loss tangent tan δ value is within this range, the electrostatic properties will be suitable when the resin is used as a binder resin for toner, and there will tend to be fewer problems such as lack of image formation due to charge deficiency, melting of the resin due to charge excess, and blotting of the photosensitive roller.

The amorphous polyester resin (B) produced in this manner may be used directly, or an amorphous resin such as conventionally known polystyrene, styrene/butadiene-based polymer, styrene/acrylic-based polymer, polyester and the like, or a crystalline polyester resin may be combined therewith, for use as a binder resin for toner. The aforementioned amorphous resins may be urethane-, urea- or epoxy-modified. According to the invention it is possible to provide a binder resin for toner, comprising an amorphous polyester resin (B) according to this embodiment. The toner binder resin may be suitably used for electrostatic charge image development.

The crystalline polyester resins that may be used in combination with the amorphous polyester resin (B) include resins produced by reaction between at least one type of dicarboxylic acid selected from among C4-12 (preferably C8-12) aliphatic dicarboxylic acids, and at least one type of diol selected from among C2-12 (preferably C8-12) aliphatic diols. Such crystalline polyester resins more preferably have melting points of 65° C. to 75° C. as measured by DSC.

There are no particular restrictions on components other than the binder resin in the toner comprising the binder resin for toner of the invention, which may be appropriately selected according to the purpose, and examples include conventionally known components including coloring agents such as pigments, inorganic fine particles, organic fine particles, charge controllers and release agents.

Also, a binder resin dispersion for toner can be obtained by dispersion or emulsification of the amorphous polyester resin of this embodiment in an aqueous medium. The aqueous medium may be water, or a mixed solvent comprising water and a solvent that is miscible with water (for example, a C1-4 lower alcohol or glycol, or a ketone such as methyl ethyl ketone and acetone). Examples for the method of dispersion or emulsification include methods employing a media type disperser (bead mill) or high pressure disperser (homogenizer or ultimizer), and methods of reverse phase emulsification in which water is added to a solution of the amorphous polyester resin (B) dissolved in an organic solvent, for phase reversion from an oil phase to an aqueous phase.

When the amorphous polyester resin of the invention is to be used as a binder resin for production of toner, a chemical toner obtained by a method known in the prior art such as a kneading-pulverizing method, a spray drying method and an emulsification-aggregation method may be employed, and the components used for production of the toner may be components known in the prior art. An emulsification-aggregation method is preferred to reduce the fine particle diameter of the toner and control the particle diameter distribution. The amorphous polyester resin (B) of the invention is suitable for a binder resin dispersion for toner, as explained above, and can be satisfactorily used in an emulsification-aggregation method.

EXAMPLES

The invention will now be described in greater detail by examples, with the understanding that the invention is not limited thereto.

(Evaluation Method)

The evaluations in the examples were carried out by the following methods.

(1) Hydroxyl Value

The hydroxyl value of the polyester resin was measured by phthalating Method B of JIS K 1557-1(2007).

(2) Acid Value

The acid value of the polyester resin was measured according to the neutralization titration method of JIS K 0070 (1992) 3.1, using a 0.1 mol/L sodium hydroxide aqueous solution as the measuring titrant and using a mixed solvent of tetrahydrofuran:water=10:1 (volume ratio) as the measuring solvent, and dissolving 3 g of sample in 60 mL of the mixed solvent.

(3) Average Molecular Weight

The weight-average molecular weight, number-average molecular weight and molecular weight distribution of the polyester resin were measured by the following methods. Specifically, 5 mL of tetrahydrofuran was added to and mixed with 2 mg of polyester resin, and the weight-average molecular weight Mw, number-average molecular weight Mn and molecular weight distribution Mw/Mn of the tetrahydrofuran solubilized portion were obtained by GPC, based on polystyrene conversion. The calibration curve was drawn using a polystyrene reference sample (GL Sciences Inc.). Also, the percentage (%) of components of the polyester resin with weight-average molecular weight Mw of up to 500 was calculated by the area ratio ($Mw_{500}/Mw_{total} \times 100$) of the area $Mw_{500}$ enclosed by the detection peak for polyester resin of weight-average molecular weight Mw of up to 500 and the baseline, with respect to the area $Mw_{total}$ enclosed by the detection peak for the total polyester resin and the baseline.

<Measuring Apparatus>
HLC-8220GPC (Tosoh Corp.)
<Detector>
RI Detector
<Measuring Conditions>
Mobile phase: Tetrahydrofuran
Column. Two Tsk-gel Super HZ2000 columns and one Tsk-gel Super HZ4000 column, connected in series.
Temperature of sample injector and column: 40° C.
RI detector temperature: 35° C.
Sample injection amount: 5 µL
Flow rate: 0.25 mL/min
Measuring time: 40 minutes (4) Glass Transition Point The glass transition point of the polyester resin was measured according to JIS K7121 (1987) 9.3 (3). A DSC-6220 differential scanning calorimeter (product of SII NanoTechnology Inc.) was used as the measuring apparatus, and measurement was conducted under the following conditions. On a graph of the measurement data plotting heat flow on the ordinate and measuring temperature on the abscissa, the glass transition point was defined as the temperature at the intersection between a straight line extending the low-temperature end baseline toward the high-temperature end, and the tangent line at the point where the slope of the curve is maximum at the portion where the glass transition varies in a step-wise manner.

<Measuring Conditions>
Temperature-elevating and temperature-lowering rate: 10° C./min
Temperature-elevating program: Temperature increase from room temperature to 150° C., followed by holding at 150° C. for 1 minute. This was followed by temperature decrease to 0° C., holding at 0° C. for 1 minute and further temperature increase to 150° C.
Atmosphere: Nitrogen stream (50 mL/min)
Cell: Sealed aluminum
Sample weight: 5 mg (5) Temperature for Melt Viscosity of 10,000 Pa·s Using a CFT-500 elevated flow tester (product of Shimadzu Corp.), 1.0 g of amorphous polyester resin was placed in a cylinder equipped with a die (length: 1.0 mm, diameter: ϕ0.5 mm) and held at 90° C. for 5 minutes, after which a load of 25 kg was applied with a plunger while raising the temperature by 3° C./min and measuring the melt viscosity, and the temperature at which the melt viscosity was 10,000 Pa·s was recorded.

(6) Particle Diameter Distribution

The volume-average particle diameter (D50v) and volume particle diameter distribution index (GSDv) of the resin particles in the amorphous polyester resin dispersion were measured in the following manner using a laser diffraction particle diameter distribution analyzer (LA-920, product of Horiba, Ltd.). The sample in a dispersed state was loaded into a cell to an appropriate concentration, and after waiting for 2 minutes when the concentration in the cell stabilized, the mean particle diameter was measured. The volume-average particle diameter for each obtained channel was cumulated in order from the smaller volume-average particle diameters, and the particle diameter with a 50 vol % cumulative volume was recorded as the volume-average particle diameter (D50v). Also, representing the particle diameter with a 16 vol % cumulative volume as D16v and the particle diameter with a 84 vol % cumulative volume as D84v, the value of D84v/D16v was recorded as the volume particle diameter distribution index (GSDv).

(7) Molecular Weight Between Crosslinking Points (Mc)

A dynamic viscoelasticity measuring apparatus ARES rheometer (product of TA Instruments, Japan) was used to measure the storage elastic modulus G' of the polyester resin at temperature T, under the following measuring conditions. The storage elastic modulus G' was measured by anchoring the sample between parallel plates, applying reciprocally-oscillated twist strain at an oscillation frequency of 6.28 rad/sec from one side, and detecting the stress on the other side against this strain. The temperature was gradually increased from room temperature in this state, and the temperature dependence of viscoelasticity was measured.

<Measuring Conditions>
Oscillation frequency: 6.28 rad/sec
Measuring temperature: 0° C. to 200° C.
Parallel plates: $\phi$15 mm
Measuring CAP: 1.0 mm
Strain: Autovariable from 0.1%
Temperature-elevating rate: 3° C./min The molecular weight between crosslinking points Mc was then calculated based on the following equation.

$$Mc = dRT/G'$$

(Here, d represents the resin density (g/cm$^3$), R represents the gas constant, T represents the center temperature for the rubber flat region, and G' represents the storage elastic modulus (Pa) at the center temperature T in the rubber flat region.)

Production of Polyester Resin (A)

Production Example 1

To a reactor that had been thoroughly dried beforehand there were added 35 parts by mole of a 2.2 mol ethylene oxide adduct of bisphenol A, 65 parts by mole of a 2.3 mol propylene oxide adduct of bisphenol A, 84 parts by mole of ethylene glycol, 42 parts by mole of terephthalic acid, 42 parts by mole of dimethyl terephthalate, 8 parts by mole of tetrapropenylsuccinic anhydride and 4 parts by mole of trimellitic anhydride, and the mixture was heated to 180° C. while stirring with nitrogen aeration. As the catalyst used there was added 0.05 part by mole of n-tetrabutoxytitanium, and the temperature was raised to 250° C. Next, the pressure was reduced until the pressure inside the reactor finally reached 2 kPa or lower, and polycondensation reaction was carried out at 250° C. to the prescribed weight-average molecular weight, to obtain polyester resin (A-1).

Production Examples 2 to 9 and Comparative Production Examples 1 to 3

Polyester resins (A-2) to (A-9) and (C-1) to (C-3) were obtained in the same manner as Production Example 1, except for changing the starting materials and composition (molar ratio) as shown in Table 1. In Table 1, EO and PO stand for ethylene oxide and propylene oxide, respectively.

The DMT·EG reaction product listed in Table 1 was produced in the following manner. To a pre-dried reactor there were added 100 parts by mole of dimethyl terephthalate, 220 parts by mole of ethylene glycol, and as a catalyst, 0.004 part by mole of zinc acetate, and the temperature was raised under nitrogen aeration while stirring to accomplish uniform dissolution. Next, the temperature of the solution was slowly raised to 170° C. to obtain a DMT·EG reaction product. The concentration of the terephthalic acid residue in 1 g of the DMT·EG reaction product (mol/g) was measured with a Model U-3410 Automatic Spectrophotometer (product of Hitachi, Ltd.), and the average molecular weight of the DMT·EG reaction product was calculated to be 250. Also, the content of terephthalic acid residue in 1 g of DMT·EG reaction product was measured by UV (absorbance) to be 0.004 mol. Incidentally, the numerical values listed in the row DMT·EG reaction product in Table 1 represent the contents (parts by mole) of terephthalic acid residue in the added DMT·EG reaction product. In Production Example 5, the DMT·EG reaction product was added so that the terephthalic acid residue content (parts by mole) is the value shown in Table 1.

The physical properties of the polyester resin (A) obtained in each production example are shown in Table 1.

TABLE 1

| | | Prod. Ex. 1 A-1 | Prod. Ex. 2 A-2 | Prod. Ex. 3 A-3 | Prod. Ex. 4 A-4 | Prod. Ex. 5 A-5 | Prod. Ex. 6 A-6 | Prod. Ex. 7 A-7 |
|---|---|---|---|---|---|---|---|---|
| Bisphenol A PO2.3 molar adduct | | 65 | 65 | 65 | 65 | 65 | 65 | 65 |
| Bisphenol A EO2.2 molar adduct | | 35 | 35 | 35 | 35 | 35 | 35 | 10 |
| Bisphenol S EO2.0 molar adduct | | — | — | — | — | — | — | 15 |
| Ethylene glycol (EG) | | 84 | 80 | 72 | 15 | — | 60 | 60 |
| Trimethylolpropane | | — | — | — | — | — | — | — |
| Terephthalic acid | | 42 | 40 | 36 | 75 | — | 30 | 30 |
| Dimethyl terephthalate (DMT) | | 42 | 40 | 36 | — | — | 42 | 42 |
| DMT·EG reaction product | | — | — | — | — | 84 | — | — |
| Tetrapropenylsuccinic anhydride | | 8 | 4 | 15 | 5 | 8 | 5 | 5 |
| Phthalic anhydride | | — | — | — | — | — | 15 | — |
| Succinic anhydride | | — | — | — | — | — | — | 15 |
| Trimellitic anhydride | | 4 | 3 | 8 | 4 | 4 | 4 | 4 |
| n-Tetrabutoxytitanium | | 0.05 | 0.05 | 0.05 | — | 0.05 | 0.05 | 0.05 |
| Dibutyltin oxide | | — | — | — | 0.05 | — | — | — |
| Polyester resin | Weight average mol. wt. $Mw_A$ | 17400 | 6900 | 35800 | 16100 | 17900 | 17700 | 17000 |
| | Hydroxyl value $OHV_A$ (mgKOH/g) | 31 | 45 | 23 | 32 | 28 | 29 | 30 |
| | Acid value $AV_A$ (mgKOH/g) | 1.6 | 2.9 | 2.9 | 3.8 | 1.2 | 3.0 | 2.8 |
| | Glass transition point (° C.) | 61 | 53 | 57 | 60 | 61 | 58 | 60 |

TABLE 1-continued

|  |  | Prod. Ex. 8 A-8 | Prod. Ex. 9 A-9 | Comp. Prod. Ex. 1 C-1 | Comp. Prod. Ex. 2 C-2 | Comp. Prod. Ex. 3 C-3 |
|---|---|---|---|---|---|---|
|  | Bisphenol A PO2.3 molar adduct | 60 | 65 | 65 | 65 | 65 |
|  | Bisphenol A EO2.2 molar adduct | 33 | 35 | 35 | 35 | 35 |
|  | Bisphenol S EO2.0 molar adduct | — | — | — | — | — |
|  | Ethylene glycol (EG) | 90 | 68 | 84 | 66 | — |
|  | Trimethylolpropane | 5 | — | — | — | — |
|  | Terephthalic acid | 45 | 32 | 42 | 33 | 67 |
|  | Dimethyl terephthalate (DMT) | 45 | 32 | 42 | 33 | — |
|  | DMT·EG reaction product | — | — | — | — | — |
|  | Tetrapropenylsuccinic anhydride | 8 | 8 | 4 | 15 | 8 |
|  | Phthalic anhydride | — | — | — | — | 15 |
|  | Succinic anhydride | — | — | — | — | — |
|  | Trimellitic anhydride | — | 17 | 3 | 13 | 10 |
|  | n-Tetrabutoxytitanium | 0.05 | 0.05 | 0.05 | 0.05 | — |
|  | Dibutyltin oxide | — | — | — | — | 0.05 |
| Polyester resin | Weight average mol. wt. $Mw_A$ | 16800 | 17100 | 5800 | 45400 | 21000 |
|  | Hydroxyl value $OHV_A$ (mgKOH/g) | 30 | 30 | 55 | 14 | 14 |
|  | Acid value $AV_A$ (mgKOH/g) | 2.9 | 3.1 | 2.8 | 0.7 | 18 |
|  | Glass transition point (° C.) | 55 | 60 | 51 | 64 | 61 |

Production of Amorphous Polyester Resin (B)

Example 1

After adding 98.6 parts by mass of polyester resin (A-1) to a thoroughly pre-dried reactor, it was heated to 200° C., and 1.4 parts by mass of trimellitic anhydride was further added for reaction at ordinary pressure to the prescribed acid value, to obtain amorphous polyester resin (B-1). The molecular weight between crosslinking points of the obtained amorphous polyester resin (B-1) was $1.2 \times 10^7$.

Examples 2 to 9 and Comparative Examples 1 to 6

Amorphous polyester resins (B-2) to (B-9) and (D-1) to (D-6) were obtained in the same manner as Example 1, except for changing the starting materials, composition (mass ratio) and polymerization conditions as shown in Table 2 and Table 3.

The physical properties of the amorphous polyester resins obtained in the examples and comparative examples are shown in Table 2 and Table 3.

TABLE 2

|  |  | Example 1 B-1 | Example 2 B-2 | Example 3 B-3 | Example 4 B-4 | Example 5 B-5 | Example 6 B-6 | Example 7 B-7 | Example 8 B-8 | Example 9 B-9 |
|---|---|---|---|---|---|---|---|---|---|---|
| Polyester resin | A-1 | 98.6 | — | — | — | — | — | — | — | 97.4 |
|  | A-2 | — | 98.6 | — | — | — | — | — | — | — |
|  | A-3 | — | — | 97.9 | — | — | — | — | — | — |
|  | A-4 | — | — | — | 98.6 | — | — | — | — | — |
|  | A-5 | — | — | — | — | 98.6 | — | — | — | — |
|  | A-6 | — | — | — | — | — | 98.6 | — | — | — |
|  | A-7 | — | — | — | — | — | — | 98.6 | — | — |
|  | A-8 | — | — | — | — | — | — | — | 98.6 | — |
| Trimellitic anhydride |  | 1.4 | 1.4 | 2.1 | 1.4 | 1.4 | 1.4 | 1.4 | 1.4 | — |
| Phthalic anhydride |  | — | — | — | — | — | — | — | — | 2.6 |
| Polyester resin | Weight average mol. wt. $Mw_A$ | 17400 | 6900 | 35800 | 16100 | 17900 | 17700 | 17000 | 16800 | 17400 |
| Amorphous polyester resin | Weight average mol. wt. $Mw_B$ | 23000 | 8400 | 48000 | 19800 | 23100 | 22600 | 21900 | 20900 | 20200 |
|  | Number-average mol. wt. $Mn_B$ | 3100 | 2700 | 4500 | 2600 | 3200 | 3000 | 2900 | 2900 | 4100 |
|  | Hydroxyl value $OHV_B$ | 28 | 34 | 15 | 29 | 27 | 25 | 26 | 28 | 24 |
|  | Acid value $AV_B$ | 9 | 10 | 15 | 11 | 8 | 10 | 10 | 10 | 11 |
|  | Glass transition point | 63 | 56 | 60 | 62 | 63 | 61 | 62 | 57 | 60 |
|  | Percentage of components of Mw ≤ 500 (%) | 2.9 | 3.3 | 2.8 | 2.7 | 2.8 | 2.9 | 2.8 | 2.7 | 3.7 |
|  | Temperature at melt viscosity of 10,000 Pa·s | 106 | 97 | 106 | 105 | 107 | 105 | 107 | 105 | 103 |
| $(AV_B - AV_A)/AV_a$ (modification degree) |  | 0.60 | 0.58 | 0.67 | 0.59 | 0.57 | 0.59 | 0.60 | 0.57 | 0.62 |
| $Mw_B/Mw_A$ (molecular extension degree) |  | 1.32 | 1.22 | 1.34 | 1.23 | 1.29 | 1.28 | 1.29 | 1.24 | 1.16 |

TABLE 2-continued

|  | Example 1 B-1 | Example 2 B-2 | Example 3 B-3 | Example 4 B-4 | Example 5 B-5 | Example 6 B-6 | Example 7 B-7 | Example 8 B-8 | Example 9 B-9 |
|---|---|---|---|---|---|---|---|---|---|
| $OHV_B/AV_B$ | 3.11 | 3.40 | 1.00 | 2.64 | 3.38 | 2.50 | 2.60 | 2.80 | 2.18 |
| $Mw_B/Mn_B$ | 7.42 | 3.11 | 10.67 | 7.62 | 7.22 | 7.53 | 7.55 | 7.21 | 4.93 |
| Molecular weight between crosslinking points | $1.2 \times 10^7$ | $7.2 \times 10^7$ | $5.2 \times 10^5$ | $2.8 \times 10^7$ | $1.4 \times 10^7$ | $1.5 \times 10^7$ | $1.5 \times 10^7$ | $2.1 \times 10^7$ | $4.8 \times 10^7$ |

TABLE 3

|  |  | Comp. Ex. 1 D-1 | Comp. Ex. 2 D-2 | Comp. Ex. 3 D-3 | Comp. Ex. 4 D-4 | Comp. Ex. 5 D-5 | Comp. Ex. 6 D-6 |
|---|---|---|---|---|---|---|---|
| Polyester resin | A-1 | 98.0 | 99.6 | — | — | — | — |
|  | A-9 | — | — | — | — | 98.6 | — |
|  | C-1 | — | — | 98.1 | — | — | — |
|  | C-2 | — | — | — | 97.3 | — | — |
|  | C-3 | — | — | — | — | — | 97.7 |
| Trimellitic anhydride |  | 2.0 | 0.4 | 1.9 | 2.7 | 1.4 | 1.4 |
| Polyester resin | Weight average mol. wt. $Mw_A$ | 17400 | 17400 | 5800 | 45400 | 17100 | 21000 |
| Amorphous polyester resin | Weight average mol. wt. $Mw_B$ | 47800 | 19300 | 7800 | 61200 | 36200 | 45000 |
|  | Number-average mol. wt. $Mn_B$ | 3300 | 3000 | 2500 | 3500 | 2400 | 3200 |
|  | Hydroxyl value $OHV_B$ | 12 | 29 | 35 | 9 | 26 | 4 |
|  | Acid value $AV_B$ | 10 | 3 | 10 | 15 | 9 | 26 |
|  | Glass transition point | 67 | 61 | 57 | 76 | 65 | 71 |
|  | Percentage of components of Mw ≤500 (%) | 2.5 | 3.0 | 4.2 | 2.3 | 2.5 | 2.3 |
|  | Temperature at melt viscosity of 10,000 Pa · s | 129 | 104 | 94 | 127 | 124 | 126 |
| $(AV_B - AV_A)/AV_a$ (modification degree) |  | 0.46 | 0.50 | 0.43 | 0.61 | 0.52 | 0.62 |
| $Mw_B/Mw_A$ (molecular extension degree) |  | 2.75 | 1.11 | 1.34 | 1.35 | 2.12 | 2.14 |
| $OHV_B/AV_B$ |  | 1.20 | 9.06 | 3.50 | 0.60 | 2.89 | 0.16 |
| $Mw_B/Mn_B$ |  | 14.48 | 6.43 | 3.12 | 17.49 | 15.08 | 14.06 |
| Molecular weight between crosslinking points |  | $2.2 \times 10^5$ | $4.6 \times 10^7$ | $8.2 \times 10^7$ | $8.4 \times 10^4$ | $1.1 \times 10^5$ | $4.4 \times 10^4$ |

(Production of Toner)

—Production of Crystalline Polyester Resin—

To a thoroughly pre-dried reactor there were added 110 parts by mole of 1,9-nonanediol and 100 parts by mole of 1,10-decanedicarboxylic acid, and the mixture was heated to 150° C. while stirring under nitrogen aeration. As the catalyst there was added 0.05 part by mole of n-tetrabutoxytitanium, and the temperature was raised to 210° C. The pressure was then reduced until the pressure inside the reactor finally reached 2 kPa or lower, and polycondensation reaction was conducted at 210° C. for 2.5 hours to obtain a crystalline polyester resin. The weight-average molecular weight according to GPC was 10,300, and the acid value was 8.6 mgKOH/g. The melting point was measured using a DSC-6220 differential scanning calorimeter (product of SII Nano-Technology Inc.) to be 68° C.

—Preparation of Amorphous Polyester Resin Dispersion—

After adding 56 parts by mass of amorphous polyester resin (B-1), 35 parts by mass of methyl ethyl ketone and 9 parts by mass of 2-propyl alcohol into a three-necked flask, the mixture was agitated with a three-one motor to dissolve the resin, and then 26 parts by mass of a 5 mass % ammonia water solution was added. Also, 94 parts by mass of ion-exchanged water was slowly added for reverse phase emulsification, and then the solvent was removed. Next, ion-exchanged water was added to adjust the solid concentration to 30 mass %, to obtain an amorphous polyester resin dispersion (LB-1). The volume-average particle diameter (D50v) of the resin particles in the dispersion was 152 nm, and the volume particle diameter distribution index (GSDv) was 1.17.

Also, amorphous polyester resin dispersions (LB-2) to (LB-9), (LC-3) and (LD-1) to (LD-6) were obtained in the same manner as the amorphous polyester resin dispersion (LB-1), except for using amorphous polyester resins (B-2) to (B-9), (C-3) and (D-1) to (D-6), respectively, instead of the amorphous polyester resin (B-1).

—Preparation of Crystalline Polyester Resin Dispersion—

After adding 56 parts by mass of the obtained crystalline polyester resin, 35 parts by mass of methyl ethyl ketone and 9 parts by mass of 2-propyl alcohol into a three-necked flask, the mixture was agitated with a three-one motor to dissolve the resin, and then 26 parts by mass of a 5 mass % ammonia water solution was added. Also, 94 parts by mass of ion-exchanged water was slowly added for reverse phase emulsification, and then the solvent was removed. Next, ion-exchanged water was added to adjust the solid concentration to 30 mass %, to obtain a crystalline polyester resin dispersion. The volume-average particle diameter (D50v) of the resin particles in the dispersion was 213 nm, and the volume particle diameter distribution index (GSDv) was 1.21.

—Preparation of Coloring Agent Dispersion—

With four different colored coloring agents (carbon black, C.I. Pigment Blue 15:3, C.I. Pigment Yellow 12, C.I. Pigment Red 48:1) there were respectively mixed an anionic surfactant (NEOGEN RK, product of Dai-ichi Kogyo Seiyaku Co., Ltd.), ion-exchanged water and 1 mm-diameter glass beads, and after shaking for 10 hours while maintaining ordinary temperature, the glass beads were separated out with a nylon mesh to obtain four different colored coloring agent dispersions.

—Preparation of Release Agent Dispersion—

After mixing a release agent (paraffin wax (HNP-9, product of Nippon Seiro Co., Ltd.)), an anionic surfactant (NEOGEN RK, product of Dai-ichi Kogyo Seiyaku Co., Ltd.) and ion-exchanged water and hot melting the mixture at 110° C., a homogenizer (trade name: Homogenizer, by Gaulin) was used for dispersion treatment of the release agent (pressure: 30 MPa) to obtain a release agent dispersion.

Examples 10 to 19 and Comparative Examples 7 to 13

Production of Toners

In a round stainless steel container there were added and mixed 450 parts by mass of amorphous polyester resin dispersion (LB-1), 50 parts by mass of crystalline polyester resin dispersion, 20 parts by mass of coloring agent dispersion and 70 parts by mass of release agent dispersion. There was then further added 1.5 parts by mass of a 10 mass % aqueous solution of polyaluminum chloride as a flocculating agent, and the mixture was heated to 45° C. and stirred, and a temperature of 45° C. was maintained for 30 minutes. The temperature of the obtained contents was then slowly raised to 55° C. A sodium hydroxide aqueous solution was added to adjust the pH to 8, the temperature was raised to 90° C., and then the resin particles were aggregated and coalesced into a mass over a period of about 1 hour and cooled. After cooling, the contents were filtered and thoroughly rinsed with ion-exchanged water and dried to obtain toner (TB-1). Toners were prepared for each of the four coloring agent dispersions, to obtain a total of four different colored toners (TB-1).

Also, toners (TB-2) to (TB-10), (TD-1) to (TD-6) and (TC-3) were obtained in the same manner as toner (TB-1), except that amorphous polyester resin dispersions (LB-2) to (LB-9), (LD-1) to (LD-6) and (LC-3) were added as listed in Table 4 and Table 5, instead of the amorphous polyester resin dispersion (LB-1).

(Evaluation of Toner Performance)

The evaluation of toner performance was conducted with an IPSIO C-4500IT full color copier (product of Ricoh Co., Ltd.), modified for temperature adjustment. Each prepared toner was packaged into a toner cartridge, and a halftone image with an image density of 0.8 to 0.85 was printed onto 90 g/m² A4 plain paper and the toner performance was evaluated. The temperature was measured with a thin-film thermometer situated between the fixing roller and the paper.

For the following evaluation, the prepared four different colored toners were separately tested, and points were assigned to the four color toners based on the following scale of levels a to d.

Level a: 5 points
Level b: 3 points
Level c: 1 point
Level d: 0 points

Next, the total value of the points assigned in evaluation of the four colored toners was calculated for each evaluated property, and re-evaluation was conducted on the following scale with the results being recorded as the overall evaluation of the toner. The evaluation results are summarized in Tables 4 and 5.

A: Total of 16-20 points
B: Total of 11-15 points
C: Total of 6-10 points
D: Total of 0-5 points <Low-Temperature Fixing Property>

The minimum fixing temperature onto paper was measured during printing at a printing speed of 50 sheets/min, and judged on the following scale. For the fixing property, the minimum fixing temperature was defined as the minimum temperature at which the reduction in density was 15% or less as the average at 5 points, before and after conducting five reciprocal rubbing passes on the printed image with lens-cleaning paper under a 4.9 kPa load.

Level a: Fixable at 130° C. or lower (minimum fixing temperature of 130° C. or lower).
Level b: Fixable at 140° C. (minimum fixing temperature of higher than 130° C. and lower than 150° C.).
Level c: Fixable at 150° C. (minimum fixing temperature of 150° C. or higher and lower than 160° C.).
Level d: Fixing not possible without a temperature of 160° C. or higher (minimum fixing temperature of 160° C. or higher).

<Hot Offset Resistance>

The condition of image blotting of the fixing roller and print was visually confirmed after printing at a printing speed of 50 sheets/min, and judged on the following scale.

Level a: No blotting even at 230° C. or higher.
Level b: Slight blotting at 230° C., but no blotting at 220° C.
Level c: Slight blotting at 220° C., but no blotting at 210° C.
Level d: Blotting even at 210° C.

<Image Gloss Property>

The full color copier specified above was used, with adjustment so that 1.0±0.1 mg/cm² of toner developed on the printed matter, and the glossiness of the solid image sample when the fixing belt surface temperature was 150° C. was measured using a gloss meter (product of Nippon Denshoku Industries Co., Ltd.) under conditions with an incident angle of 75°, and judged on the following scale.

Level a: Glossiness of greater than 15 and 20 or less.
Level b: Glossiness of greater than 10 and 15 or less.
Level c: Glossiness of greater than 7 and 10 or less.
Level d: Glossiness of 7 or less.

<Blocking Resistance>

After placing 5 g of toner in a 50 mL glass sample bottle, it was allowed to stand for 24 hours in a dryer at a temperature of 50° C. and then cooled at room temperature for 24 hours, as one cycle, which was repeated twice. The state of aggregation of the toner after 2 cycles was visually examined and judged on the following scale.

Level a: Toner easily flowed when the sample bottle was inverted.
Level b: Toner flowed when the sample bottle was inverted and tapped 2-3 times (no solidification).
Level c: Toner flowed when the sample bottle was inverted and tapped 5-6 times (some solidification).
Level d: Toner failed to flow even when the sample bottle was inverted and tapped.

The evaluation results for the examples and comparative examples are summarized in Tables 4 and 5. The amorphous polyester resin (D-2) had a low acid value and could not yield a satisfactory dispersion, and therefore it was not possible to accurately evaluate the toner (TD-2).

TABLE 4

|  |  | Example 10 TB-1 | Example 11 TB-2 | Example 12 TB-3 | Example 13 TB-4 | Example 14 TB-5 | Example 15 TB-6 | Example 16 TB-7 | Example 17 TB-8 | Example 18 TB-9 | Example 19 TB-10 |
|---|---|---|---|---|---|---|---|---|---|---|---|
| Amorphous polyester resin dispersion | LB-1 | 450 | — | — | — | — | — | — | — | — | — |
| | LB-2 | — | 450 | — | — | — | — | — | — | — | 315 |
| | LB-3 | — | — | 450 | — | — | — | — | — | — | 135 |
| | LB-4 | — | — | — | 450 | — | — | — | — | — | — |
| | LB-5 | — | — | — | — | 450 | — | — | — | — | — |
| | LB-6 | — | — | — | — | — | 450 | — | — | — | — |
| | LB-7 | — | — | — | — | — | — | 450 | — | — | — |
| | LB-8 | — | — | — | — | — | — | — | 450 | — | — |
| | LB-9 | — | — | — | — | — | — | — | — | 450 | — |
| Crystalline polyester resin dispersion | | 50 | 50 | 50 | 50 | 50 | 50 | 50 | 50 | 50 | 50 |
| Coloring agent dispersion | | 20 | 20 | 20 | 20 | 20 | 20 | 20 | 20 | 20 | 20 |
| Release agent dispersion | | 70 | 70 | 70 | 70 | 70 | 70 | 70 | 70 | 70 | 70 |
| Low-temperature fixing property | | A | A | B | A | A | A | A | A | A | A |
| Hot offset resistance | | A | B | A | A | A | A | A | B | B | A |
| Image gloss | | A | A | B | A | A | A | A | A | A | A |
| Blocking resistance | | A | B | B | A | A | A | A | B | B | A |

TABLE 5

|  |  | Comp. Ex. 7 TD-1 | Comp. Ex. 8 TD-2 | Comp. Ex. 9 TD-3 | Comp. Ex. 10 TD-4 | Comp. Ex. 11 TD-5 | Comp. Ex. 12 TD-6 | Comp. Ex. 13 TC-3 |
|---|---|---|---|---|---|---|---|---|
| Amorphous polyester resin dispersion | LD-1 | 450 | — | — | — | — | — | — |
| | LD-2 | — | 450 | — | — | — | — | — |
| | LD-3 | — | — | 450 | — | — | — | — |
| | LD-4 | — | — | — | 450 | — | — | — |
| | LD-5 | — | — | — | — | 450 | — | — |
| | LD-6 | — | — | — | — | — | 450 | — |
| | LC-3 | — | — | — | — | — | — | 450 |
| Crystalline polyester resin dispersion | | 50 | 50 | 50 | 50 | 50 | 50 | 50 |
| Coloring agent dispersion | | 20 | 20 | 20 | 20 | 20 | 20 | 20 |
| Release agent dispersion | | 70 | 70 | 70 | 70 | 70 | 70 | 70 |
| Low-temperature fixing property | | D | Not evaluable | A | D | D | D | C |
| Hot offset resistance | | A | Not evaluable | C | A | A | A | B |
| Image gloss | | D | Not evaluable | B | D | C | D | C |
| Blocking resistance | | A | Not evaluable | C | A | A | A | B |

The invention claimed is:

1. An amorphous polyester resin obtained by reaction between:
   a polyester resin (A), obtained by reaction between a polyhydric alcohol component and a first poly-carboxylic acid component, either or both including a 3 or higher hydric polyhydric alcohol component and/or a 3 or higher carboxylic poly-carboxylic acid component, and having a weight-average molecular weight of 6,000 to 40,000 and a hydroxyl value of 15 to 70 mgKOH/g, and
   a second poly-carboxylic acid component (a), under conditions satisfying the following equations (1), (2) and (3),
   and the amorphous polyester resin satisfying the following equation (4), $$(AV_B - AV_A)/AV_a = 0.5\text{-}0.7 \quad (1)$$

$$Mw_B/Mw_A = 1.1\text{-}2.0 \quad (2)$$

$$OHV_B/AV_B = 1.0\text{-}6.0 \quad (3)$$

$$Mw_B/Mn_B = 3.0\text{-}15.0 \quad (4)$$

[In the equations, $AV_B$, $OHV_B$, $Mw_B$ and $Mn_B$ respectively represent an acid value, a hydroxyl value, a weight-average molecular weight and a number-average molecular weight of the amorphous polyester resin, and $AV_A$ and $Mw_A$ respectively represent an acid value and a weight-average molecular weight of the polyester resin (A), where $AV_a$ represents a theoretical acid value of the second polycarboxylic acid component (a)].

2. An amorphous polyester resin according to claim 1, having a weight-average molecular weight of 8,000 to 50,000.

3. An amorphous polyester resin according to claim 1, wherein the polyester resin (A) is obtained by reacting the polyhydric alcohol component and the first poly-carboxylic acid component under conditions satisfying either or both of the following (5) and (6),
   (5) The polyhydric alcohol component contains a 3 or higher hydric polyhydric alcohol at 0.3 to 15 mol % based on the total amount of the polyhydric alcohol component,
   (6) The first polycarboxylic acid component contains a 3 or higher carboxylic poly-carboxylic acid component at 0.3 to 20 mol % based on the total amount of the first poly-carboxylic acid component.

4. An amorphous polyester resin according to claim 1, wherein the mass ratio of the polyester resin (A) and the second poly-carboxylic acid component (a) is 99.5/0.5 to 90/10.

5. An amorphous polyester resin according to claim 1, having an acid value of 4 to 25 mgKOH/g and a hydroxyl value of 10 to 60 mgKOH/g.

6. An amorphous polyester resin according to claim 1, having a glass transition point of 55° C. to 75° C., and a temperature at a melt viscosity of 10,000 Pa·s is 95° C. to 125° C.

7. An amorphous polyester resin according to claim 1, wherein the polyhydric alcohol component contains an alkylene oxide adduct of bisphenol A, and/or an alkylene oxide adduct of bisphenol S.

8. An amorphous polyester resin according to claim 1, wherein the first poly-carboxylic acid component contains the reaction product of an aromatic poly-carboxylic acid component and a C2-4 glycol.

9. A binder resin for toner, containing an amorphous polyester resin according to claim 1.

10. A binder resin dispersion for toner, wherein an amorphous polyester resin according to claim 1 is dispersed or emulsified in an aqueous medium.

\* \* \* \* \*